UNITED STATES PATENT OFFICE.

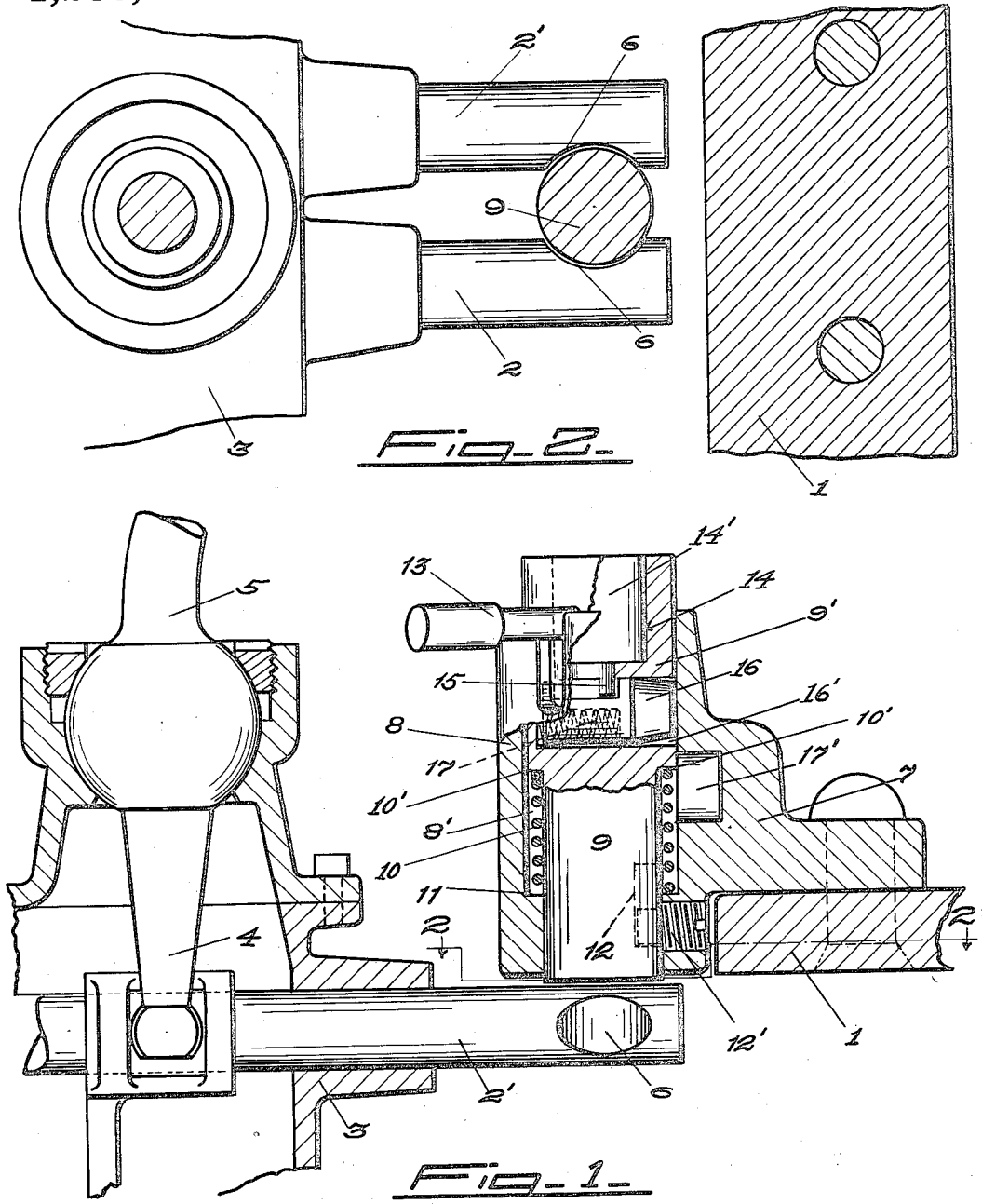

GEORGE C. JENSEN, OF OAKLAND, CALIFORNIA.

SAFETY LOCKING ATTACHMENT FOR AUTOMOBILES.

1,288,605.　　　　　Specification of Letters Patent.　　Patented Dec. 24, 1918.

Application filed August 8, 1918. Serial No. 248,864.

*To all whom it may concern:*

Be it known that I, GEORGE C. JENSEN, a citizen of the United States, residing at Oakland, in the county of Alameda and State of California, have invented certain new and useful Improvements in Safety Locking Attachments for Automobiles, of which the following is a specification.

The hereinafter described invention relates to an attachment for locking automobiles to insure the same against theft when kept standing unattended, and the same is designed more particularly as a specialty attachment to be applied to the motor vehicle after shipment thereof from the manufacturer, the same being of such construction as to permit of ready attachment to the vehicle without necessitating changes being made in the gear shift lever or in the gear casing within which the shift rods are slidably mounted.

The object of the invention is to simplify the construction of the automobile or transmission lock mechanism set forth and described in United States Letters Patent No. 1,113,980, granted F. E. Furgason under date of October 20, 1914, and to construct an automobile or transmission lock device which may be quickly installed relative to an automobile for interlocking with the sliding gear transmission devices to hold same locked against movement, and this without being connected with the gear casing or the shift lever structure, in other words, a structural device capable of being installed separated from the shift lever structure and its associated parts and from the shift rod casing or support; thereby permitting of a cheaper form of locking structure and one which may be installed at points of the automobile structure non-accessible for installation of the present types of automobile lock mechanism.

For an understanding of the invention, reference should be had to the accompanying sheet of drawings, wherein, Figure 1 is a part broken longitudinal sectional elevation of the invention as applied to the frame structure of an automobile, said view illustrating one of the sliding gear transmission rods, the usual shift lever structure for actuating the same and the locking mechanism separated from the shift lever structure and its locking bolt disengaged from the sliding gear transmission rods.

Fig. 2 is a view in plan of the shift lever and shifter devices, illustrating the locking bolt and its support in section taken on line 2—2 of Fig. 1.

In the drawings, the numeral 1 is used to designate a portion of the frame structure of an automobile and 2—2' the slide gear transmission rods which are mounted for longitudinal slide movement below the frame piece 1. These rods are slidable within the gear casing 3 and are adapted to be engaged by the lower projecting end 4 of the swinging shift lever 5 as of common practice. The slide gear shift or transmission rods are extended rearwardly beyond the gear casing or body portion 3 within which they are slidably mounted and adjacent the ends thereof are provided with notches or cutouts 6.

To the frame or frame piece 1 is secured in any suitable manner the bracket 7, which carries or supports a vertically disposed bolt guide member 8, the same being provided with a central opening or bore 8' within which is mounted for vertical movement a slide bolt 9. This bolt is provided with an enlarged head section 9' and the said bolt is normally held in raised or non-locking position by the action of a coiled spring 10, which bears against the under face 10' of the head section 9' of the slide bolt 9 and the upper surface 11 of the reduced portion of the central opening or bore 8'.

Within the vertically movable lock bolt 9 and adjacent its lower end is formed a vertically disposed slot 12, illustrated in dotted lines Fig. 1 of the drawings, and within which fits the end of a retaining screw bolt 12' projected within the bore or opening 8' of the guide 8 and by means of which the vertical movement of the locking bolt is limited and the said bolt prevented from being removed from within the guide member 8. Owing to the disposition of the said retaining screw bolt or device 12', the same is so positioned as to be hidden from view when the bracket 7 is attached to the frame piece 1 and is rendered inaccessible for tampering purposes, thus insuring the non-removal or withdrawal of the locking bolt 9.

Normally, a portion of the head section 9' of the lock bolt projects beyond the guide member 8 and to the same is attached a laterally projecting stud 13, adapted to be engaged by the foot for downwardly pressing or depressing the slide bolt against the tension of the spring 10 in order to cause the lower end of the bolt to project beyond the guide member 8 and to move within the sphere of and between and into locked engagement with the cut-outs 6 of the slide rods 2—2' for holding the said slide-rods locked against longitudinal movement.

The upper end portion of the head extension 9' of the slide-lock bolt 8 is countersunk as shown at 14, Fig. 1 of the drawings and within the same is rotatably fitted a key actuated barrel 14' of well-known construction, and which carries at its lower end an extension 15 which engages with and actuates a laterally movable lock pin 16 slidable within a seat 16' formed in the lock bolt 8. This lock pin 16 is normally held outwardly pressed by the tension of an actuating spring 17, so that when the lock bolt is depressed a given distance to place its lower end into locked engagement with the cut outs of the slide shift rods 2—2' the said lock pin automatically springs outwardly and moves into engagement with a seat 17' formed in the inner wall of the guide member 8 and by so doing holding or maintaining the lock bolt in its lower position until such time as the key actuated barrel 14' is thrown to retract the spring held lock pin 16, when the tension of the spring 10 automatically raises the lock bolt 9 and moves the same from locked engagement with the shift-rods 2 and 2'.

Inasmuch as the described locking mechanism is entirely disassociated from the shift lever and the shift mechanism of an automobile and constructed as an independent piece of mechanism, the same lends itself for placing on the markets as a specialty product for automobiles for handling through the medium of automobile supply establishments and by automobile specialty manufacturers, the only requirement in connection with the installation thereof being the forming of the cut-outs 6 relative to the rearwardly projecting ends of the slide gear rods 2—2', but it is obvious that instead of such cut outs being formed in the slide gear rods suitable pieces may be applied thereto for engagement by the slide lock bolt 9 when thrown into its lowered position.

The herein described lock mechanism may be positioned at any point relative to the automobile frame structure within the reach of the rearwardly projecting end position of the slide gear rods 2—2', or if so desired slide rods of greater length may be substituted for those supplied with the automobile. Under this construction as the lock mechanism is entirely distinct from the gear shift lever and its associated mechanism, it is possible to install the same a distance removed from the operator of the automobile as for instance the tonneau of the machine, thus placing the lock mechanism at a position unlooked for by those desiring to tamper therewith.

The device is simple and cheap in its construction and installation, dispensing as it does with the main body structure usually associated with locking devices and through which work the slide gear shift rods, and by the compactness thereof permitting of installations at points ordinarily inaccessible.

Having thus described the invention what is claimed as new and desired to be protected by Letters Patent is:

In combination with a gear case, a shifter device slidably mounted for longitudinal movement within the same and projecting at one end beyond said case, said shifter device provided at its projecting end with a stop, a support disposed adjacent the free end of said shifter device and independent of said gear case, means for locking said shifter device from movement and comprising a guide member independent of said support and gear case and disposed adjacent said shifter device, a flange extended laterally therefrom for coöperating with said support and through which said member is attached to said support, a spring held lock bolt slidably mounted within said guide member and disposed at an angle to said shifter device and capable of movement for coöperation with said stop on the registry of the same therewith, means for limiting the movement of the lock bolt and preventing the removal thereof from within the guide member, a spring pressed slide device for holding the lock bolt in its depressed position, and key actuated means for actuating said device for the release of the lock bolt.

In testimony whereof I have signed my name to this specification in the presence of two subscribing witnesses.

GEORGE C. JENSEN.

Witnesses:
N. A. ACKER,
D. B. RICHARDS.